T. JONES.
RETURN OR CONDENSATION VALVE.
APPLICATION FILED MAR. 12, 1914.
1,196,955.
Patented Sept. 5, 1916.
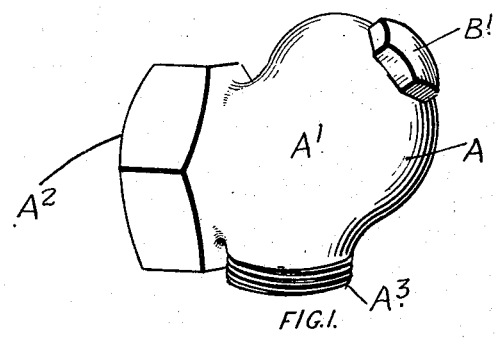
FIG.1.
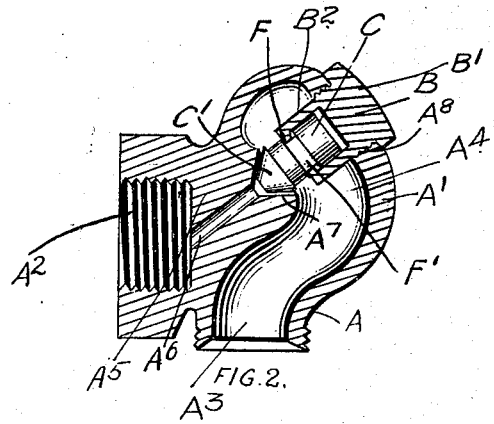
FIG.2.
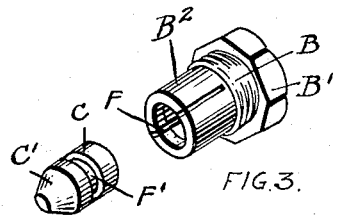
FIG.3.
FIG.4.
WITNESSES.
INVENTOR.
T. JONES.

UNITED STATES PATENT OFFICE.

TRAFFORD JONES, OF TORONTO, ONTARIO, CANADA.

RETURN OR CONDENSATION VALVE.

1,196,955.  Specification of Letters Patent.  Patented Sept. 5, 1916.

Application filed March 12, 1914. Serial No. 824,247.

*To all whom it may concern:*

Be it known that I, TRAFFORD JONES, of the city of Toronto, in the county of York, in the Province of Ontario, Canada, have invented certain new and useful Improvements in Return or Condensation Valves, of which the following is the specification.

My invention relates to improvements in return or condensation valves and the object of the invention is to provide a cheap valve of this class comprising a minimum amount of parts and therefore less liable to become out of order, through which a more direct fluid flow is possible, in which there is less liability of leakage through solid particles entering and remaining between the valve and its seat and from choking through accumulation of such particles, in which the continued operation will tend to maintain a close fit between the valve and its seat, in which there are no parts liable to be easily worn out and which will be cheap to manufacture, easily assembled or disassembled and in which the interior parts can be easily gotten at at any time required and it consists essentially of an angle casting provided with an inlet orifice having a constricted inner end portion extending upwardly at an obtuse angle and terminating in a tapered valve seat, a valve chamber located opposite the valve seat and an outlet leading from such valve orifice, an internally threaded orifice formed in the valve chamber opposite the valve seat, a threaded plug fitting such orifice provided with an inwardly extending hollow stem, and a cylindrical valve fitting below the stem and provided with a tapered end designed to fit the valve seat and co-acting therewith as hereinafter more particularly explained by the following specification.

Figure 1, is a general perspective view of a valve constructed in accordance with my invention. Fig. 2, is a vertical section through Fig. 1. Fig. 3, is a detail of the valve holding plug. Fig. 4, is a detail of the valve.

In the drawings like letters of reference indicate corresponding parts in each figure.

A is the valve casing comprising the body A' into which extends the inlet duct $A^2$ and from which extends the outlet duct $A^3$ and in which is formed a valve chamber $A^4$ divided from the inlet by cross webbing $A^5$. The inlet duct $A^2$ is provided with a constricted portion $A^6$ extending upwardly at an obtuse angle thereto and terminating in a tapered valve seat $A^7$.

$A^8$ is an internally threaded orifice formed in the valve casing and leading into the valve chamber $A^4$.

B is an externally threaded plug fitting the internally threaded orifice and provided with an end head B' at its outer end and a hollow stem $B^2$ at its inner end.

C is the valve plug provided with a tapered inner end C'. The valve C fits freely within the hollow stem $B^2$.

When the steam is turned into the system connected to my valve any condensations or air which have collected in such system are forced out through the passage $A^6$ raising the valve off its seat passing out of the outlet $A^3$ at a comparatively low velocity. When, however, the steam has forced out all the air and water in the system it passes through the valve at a higher velocity causing a vacuum tension beneath the valve, the valve body being under the influence of normal atmospheric pressure the vacuum tension reduces such normal pressure at one end of the valve causing the valve to move in that direction to seat and thereby automatically cutting off the outlet of steam. The valve plug may be provided with an internal annular flange F fitting freely into a groove F' in the valve so as to insure of its positive withdrawal.

From this description it will be seen that I have devised a very simple form of return or condensation valve in which air and water may be forced out through the valve and yet will be automatically closed when the full steam pressure is exerted thereon.

What I claim as my invention is.

1. A return or condensation valve comprising a valve body having a thickened wall at the inlet side of the valve closing the inlet and provided with a diminutive passageway leading from the inlet and ending within the valve chamber, in a conical valve seat, of a conical valve co-acting with said seat and provided with a suitable stem, and means on the opposite wall to support the valve and yet allow of a limited longitudinal and free turning movement of the valve in relation to its seat whereby upon the water passing through the passageway at a low velocity the valve is unseated and when steam passes through the passageway at its high velocity the suction created between the valve and its seat reduces the atmospheric pressure at that end of the valve below normal and draws the valve closed.

2. A return or condensation valve comprising a valve body provided with a conical valve seat, a co-acting conical valve, means for slidably supporting the valve so as to move at right angles to the seat and be seated by high steam velocity passing between the valve and its seat, and supplemental manual means for positively withdrawing the valve from its seat and holding it in its open position, as and for the purpose specified.

TRAFFORD JONES.

Witnesses:
 B. BOYD,
 M. EGAN.

Copies of this patent may be obtained for five cents each, by addressing the "Commissioner of Patents, Washington, D. C."